United States Patent
Masaka

(10) Patent No.: US 10,513,068 B2
(45) Date of Patent: Dec. 24, 2019

(54) METHOD OF MANUFACTURING SUBSTRATE INTEGRATED GASKET

(71) Applicant: NOK CORPORATION, Tokyo (JP)

(72) Inventor: Takeshi Masaka, Kikugawa (JP)

(73) Assignee: NOK CORPORATION (JP)

( * ) Notice: Subject to any disclaimer, the term of this patent is extended or adjusted under 35 U.S.C. 154(b) by 19 days.

(21) Appl. No.: 15/739,126

(22) PCT Filed: Jun. 10, 2016

(86) PCT No.: PCT/JP2016/067315
§ 371 (c)(1),
(2) Date: Dec. 21, 2017

(87) PCT Pub. No.: WO2017/002579
PCT Pub. Date: Jan. 5, 2017

(65) Prior Publication Data
US 2018/0186047 A1    Jul. 5, 2018

(30) Foreign Application Priority Data
Jun. 29, 2015 (JP) .................................. 2015-129820

(51) Int. Cl.
*B29C 45/14* (2006.01)
*F16J 15/10* (2006.01)
(Continued)

(52) U.S. Cl.
CPC .... *B29C 45/14311* (2013.01); *B29C 45/0025* (2013.01); *B29C 45/14* (2013.01);
(Continued)

(58) Field of Classification Search
CPC ................ B29C 45/0025; B29C 45/14; B29C 45/14336; B29C 45/14311
(Continued)

(56) References Cited

U.S. PATENT DOCUMENTS

2003/0075259 A1*  4/2003  Graham .............. B29C 43/3642
156/94

FOREIGN PATENT DOCUMENTS

CN    202 985 993 U    6/2013
EP      0 845 340 A2    6/1998
(Continued)

OTHER PUBLICATIONS

Extended European Search Report for Application No. EP 16 81 7688 dated Jun. 13, 2018 (5 pages).
(Continued)

*Primary Examiner* — Michael N Orlando
*Assistant Examiner* — Abhishek A Patwardhan
(74) *Attorney, Agent, or Firm* — Harness, Dickey & Pierce, P.L.C.

(57) ABSTRACT

A method of manufacturing a substrate integrated gasket that includes applying an adhesive agent onto a surface of the substrate in a pattern that corresponds to a configuration of the substrate integrated gasket, wherein the pattern of the adhesive agent includes a first section having dimensions that correspond to a length and width of substrate integrated gasket, a plurality of second sections that extend away from the first section, and third sections that do not include the adhesive agent. The third sections that do not include the adhesive agent define a passageway between a mold cavity to an exterior of the mold that is configured to expel a gas from the mold cavity during injection of a molding material into the mold cavity.

1 Claim, 6 Drawing Sheets

(51) Int. Cl.
*B29C 45/00* (2006.01)
*H01M 8/0276* (2016.01)
*H01M 8/0286* (2016.01)
*B29K 21/00* (2006.01)
*B29L 31/26* (2006.01)
*B29L 31/34* (2006.01)

(52) U.S. Cl.
CPC ......... *B29C 45/14336* (2013.01); *F16J 15/10* (2013.01); *H01M 8/0276* (2013.01); *H01M 8/0286* (2013.01); *B29C 2045/14459* (2013.01); *B29C 2045/14868* (2013.01); *B29C 2045/14959* (2013.01); *B29K 2021/00* (2013.01); *B29K 2905/00* (2013.01); *B29L 2031/26* (2013.01); *B29L 2031/265* (2013.01); *B29L 2031/3468* (2013.01); *B32B 2581/00* (2013.01); *Y02P 70/56* (2015.11); *Y10T 428/215* (2015.01)

(58) Field of Classification Search
USPC .................................. 264/134, 135, 478
See application file for complete search history.

(56) References Cited

FOREIGN PATENT DOCUMENTS

| | | |
|---|---|---|
| JP | 2008-168448 A | 7/2008 |
| JP | 2009-158241 A | 7/2009 |
| JP | 2011-129267 A | 6/2011 |

OTHER PUBLICATIONS

International Search Report (in English and Japanese) issued in PCT/JP2016/067315, dated Jul. 19, 2016; ISA/JP.

\* cited by examiner

*PRIOR ART*

PRIOR ART

METHOD OF MANUFACTURING SUBSTRATE INTEGRATED GASKET

CROSS-REFERENCE TO RELATED APPLICATIONS

This application is a U.S. National Stage Application of International Application No. PCT/JP2016/067315, filed on Jun. 10, 2016, and published in Japanese as WO 2017/002579 A1 on Jan. 5, 2017 and claims priority to Japanese Application No. 2015-129820, filed on Jun. 29, 2015. The entire disclosures of the above applications are incorporated herein by reference.

BACKGROUND OF THE INVENTION

Field of the Invention

The present invention relates to a method of manufacturing a gasket which is integrated with a substrate by using a metal mold.

Description of the Conventional Art

For example, a fuel battery is provided with a substrate integrated gasket obtained by integrally bonding a gasket 2 made of a rubber elastic body (a rubber material or a synthetic resin material having a rubber-like elasticity) with a substrate 1 such as a separator corresponding to a constructing part of the fuel battery cell, as shown in FIG. 6, as a means for sealing fuel gas or oxidation gas. Further, the structure in which the gasket 2 is integrally bonded with the substrate 1 via an adhesive agent layer 3 has been known as this kind of substrate integrated gasket.

FIG. 7 shows a typical prior art of the method of manufacturing the substrate integrated gasket as mentioned above. More specifically, in the manufacturing method, the substrate 1 having the adhesive agent layer 3 previously formed on a surface thereof by application of the adhesive agent is first of all positioned and fixed between metal molds 101 and 102, a liquid-like rubber is injected into a gasket forming cavity 103 which is defined between the adhesive agent layer 3 on the surface of the substrate 1 and an inner surface of the one metal mold 101 according to a method such as a liquid injection molding (LIM) method, and the gasket is integrally bonded with the substrate 1 via the adhesive agent layer 3 at the same time of forming the gasket by crosslinking and curing on the basis of a thermal reaction (refer, for example, to the Japanese Unexamined Patent Publication No. 2008-168448).

However, according to the conventional method of manufacturing the substrate integrated gasket, a mold clamping surface 101a in the periphery of the cavity 103 in the metal mold 101 comes to a state in which the mold clamping surface 101a is closely attached to the adhesive agent layer 3 on the surface of the substrate 1 at the mold clamping time shown in FIG. 7. As a result, in order to prevent defective molding caused by residual air within the cavity 103, it is necessary to provide a desired number of air vents (not shown) extending from the cavity 103 in the metal mold 101. Therefore, a post-process for removing burrs constructed by cured materials of the liquid rubber flowing into the air vents has been necessary after completion of the molding.

The present invention has been made by taking the above points into consideration, and a technical object of the present invention is to provide a method of manufacturing a substrate integrated gasket which can make the provision of the air vents extending from the cavity in the metal mold unnecessary and can therefore make the post-process for removing the burrs formed within the air vents unnecessary.

SUMMARY OF THE INVENTION

The present invention employs the following means for achieving the technical object mentioned above.

More specifically, a method of manufacturing a substrate integrated gasket according to the present invention includes an application step of applying an adhesive agent onto a surface of a substrate according to a predetermined pattern which corresponds to an extending shape of the gasket to be formed, and a step of filling an uncured molding material into a cavity which is defined between the substrate and an inner surface of a metal mold by setting the substrate within the metal mold and mold clamping and curing the uncured molding material, and the application step forms a main application area of the adhesive agent which extends along an extending direction of the cavity, a partial application area of the adhesive agent which can come into close contact with the metal mold in an outer side of the cavity, and a non-application area of the adhesive agent which reaches a position in an inner side of the cavity from a position in an outer side of the cavity.

According to the method mentioned above, the molding material filled in the cavity defined by the mold clamping is formed as the gasket having the shape which corresponds to the cavity by the curing, and is integrally bonded to the substrate via the adhesive agent layer. Further, since the partial application area formed so as to be positioned in the outer side of the cavity in the adhesive agent layer on the surface of the substrate is interposed between the metal mold and the substrate which are opposed to each other in the outer side of the cavity at the mold clamping time, a minute gap is formed by the non-application area which reaches the position in the inner side of the cavity from the position in the outer side of the cavity, and the minute gap forms a discharge passage for the air and the gas within the cavity in a process of filling the molding material. Further, the minute gap can easily pass the air and the gas therethrough, however, suppress outflow of the molding material.

Effect of the Invention

On the basis of the method of manufacturing the substrate integrated gasket according to the present invention, the remaining air within the cavity is easily discharged to the outer side of the cavity through the minute gap which is formed by the non-application area of the adhesive agent, in the filling process of the molding material into the cavity. As a result, it is possible to prevent the defective molding, so that it is not necessary to provide the air vent in the metal mold and it is possible to make the post-process for removing the burrs which are generated in the air vent unnecessary.

BRIEF EXPLANATION OF THE DRAWINGS

FIGS. 3A and 3B show the mold clamping state in the preferable embodiment of the method of manufacturing the substrate integrated gasket according to the present invention, in which FIG. 3A is a cross sectional view along a line A-A' in FIG. 2, and FIG. 3B is a cross sectional view along a line B-B';

DETAILED DESCRIPTION OF PREFERRED EMBODIMENTS

A description will be given below of a preferable embodiment in which a method of manufacturing a substrate integrated gasket according to the present invention is applied to manufacturing of a substrate integrated gasket shown in FIG. 4, with reference to the accompanying drawings.

Figure 1:
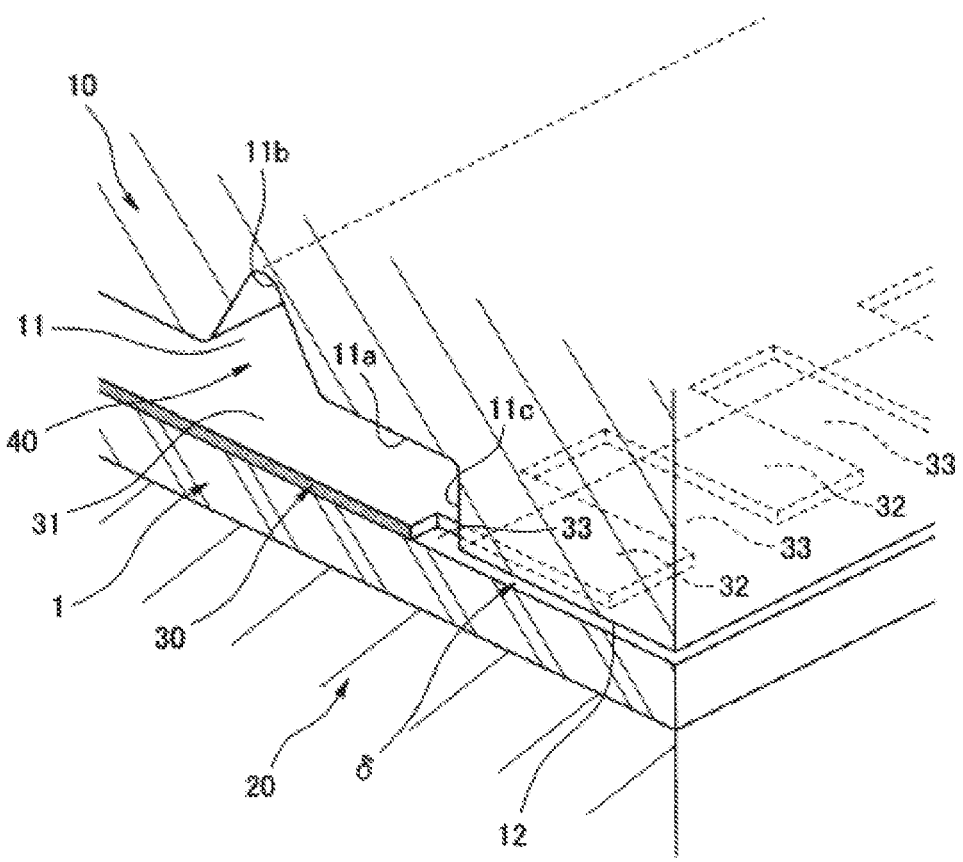
FIG. 1 is a perspective view of a partial cross section and shows a mold clamping state in a preferable embodiment of a method of manufacturing a substrate integrated gasket according to the present invention.

First of all, a mold clamping state shown in FIG. 1, reference numeral 10 denotes an upper mold in an LIM forming metal mold device, reference numeral 20 denotes a lower mold in the LIM forming metal mold device, and reference numeral 1 denotes a substrate with which a gasket is integrally formed.

The substrate 1 is positioned and installed in an upper surface of the lower mold 20, and a groove-shaped concave portion 11, a mold clamping surface 12 and a gate (not shown) are formed in a lower surface of the upper mold 10 which is arranged in an upper side of the lower mold 20. The groove-shaped concave portion 11 is provided for defining a gasket forming cavity 40 in relation to the substrate 1 on the lower mold 20 in the illustrated mold clamping state. The mold clamping surface 12 is provided for pinching the substrate 1 in relation to the lower mold 20 around the cavity 40 (the groove-shaped concave portion 11). The gate is provided for injecting a liquid rubber obtained by mixing a plurality of liquid molding materials to the cavity 40.

Figure 4:
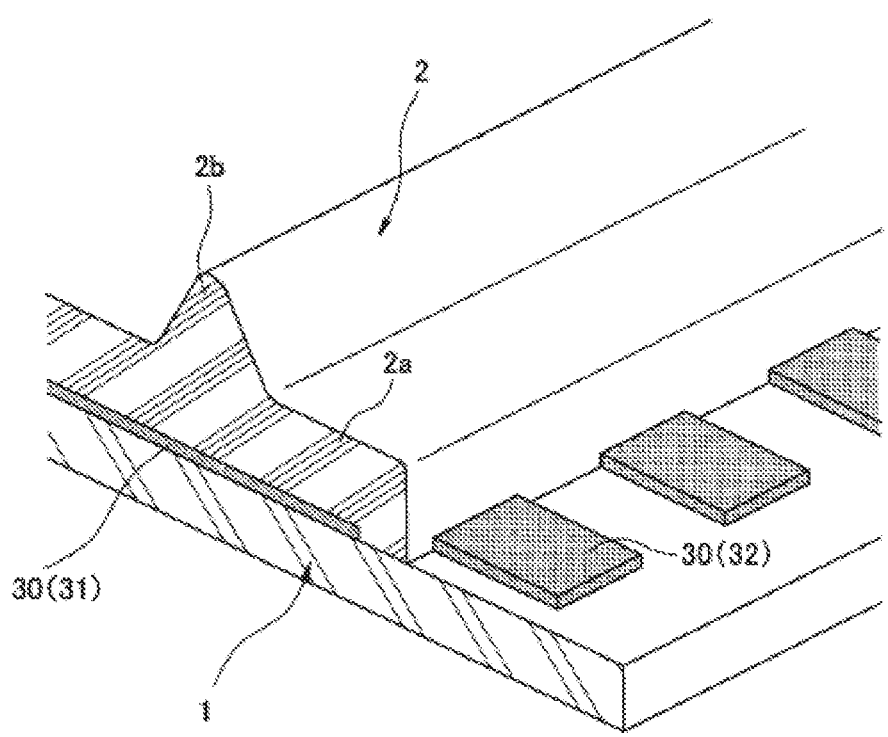
FIG. 4 is a perspective view of a partial cross section and shows a mold opening state in the preferable embodiment of the method of manufacturing the substrate integrated gasket according to the present invention.

The groove-shaped concave portion 11 forming the cavity 40 extends in an endless manner in a plane direction according to a predetermined pattern which corresponds to an extending shape of a gasket to be formed (a gasket 2 shown in FIG. 4), and is constructed by a flat base forming portion 11a in the substrate 1 side and a seal lip forming portion 11b in an upper side thereof, in correspondence to a cross sectional shape of the gasket to be formed (the gasket 2 shown in FIG. 4).

Figure 2:
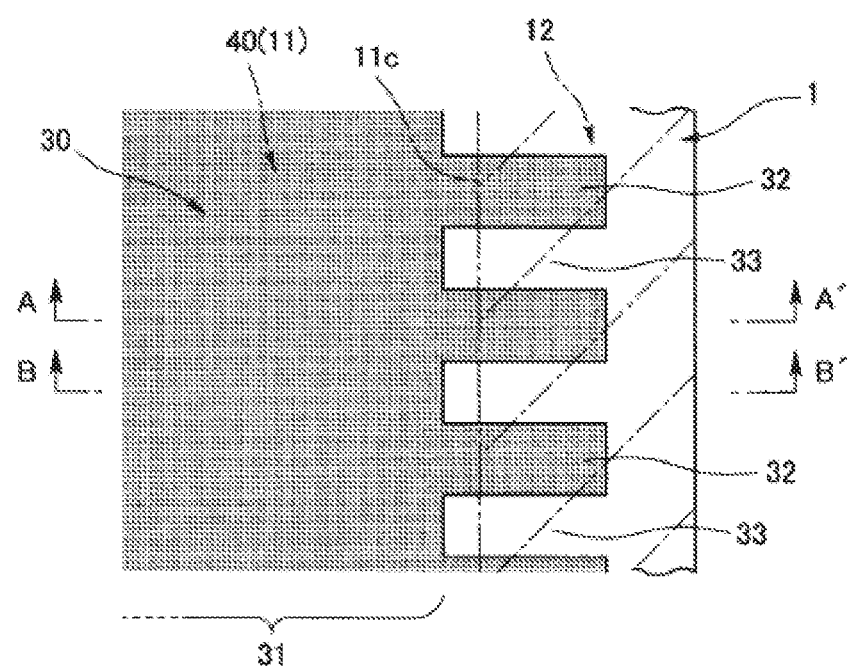
FIG. 2 is a partial plan view showing a relationship between an adhesive agent layer on the substrate and a metal mold in the preferable embodiment of the method of manufacturing the substrate integrated gasket according to the present invention.
Figure 3A:
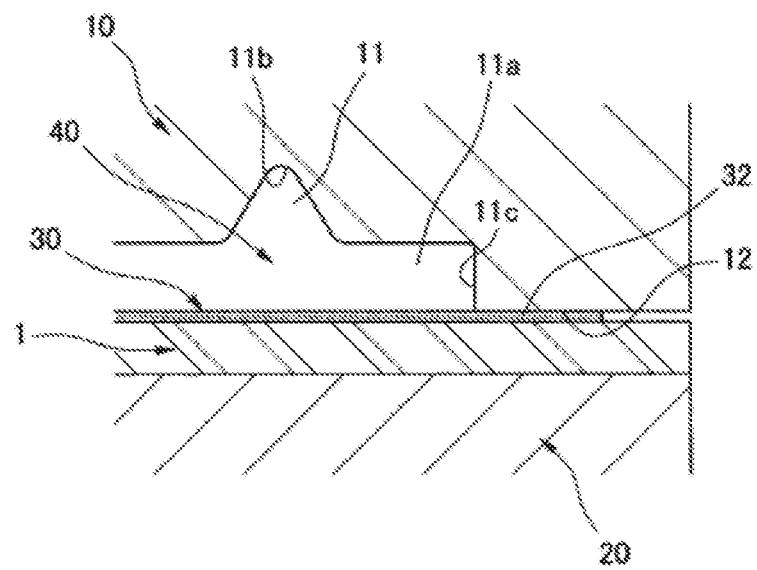
Figure 3B:
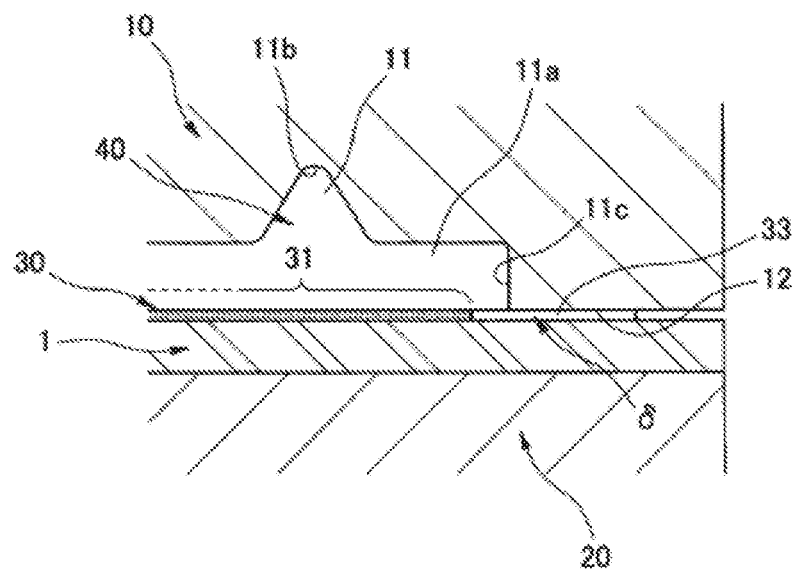

An adhesive agent layer 30 is previously formed on a surface of the substrate 1 according to a predetermined pattern which corresponds to the extending shape of the gasket to be formed (the gasket 2 shown in FIG. 4), in other words, an extending shape of the cavity 40. In detail, a process for forming the adhesive agent layer 30 by applying the adhesive agent onto the surface of the substrate 1 forms a main application area 31 of the adhesive agent, partial application areas 32 of the adhesive agent and non-application areas 33, as shown in FIG. 2 and FIGS. 3A and 3B. The main application area 31 extends along a surface which is opposed to the groove-shaped concave portion 11 forming the cavity 40, the partial application areas 32 protrude out of the main application area 31 like a band to an outer side in a width direction at predetermined intervals in an extending direction thereof and can come into close contact with the mold clamping surface 12 of the upper mold 10 in an outer side of the cavity 40 in the mold clamping, and the non-application areas 33 are formed between the adjacent partial application areas 32 and 32. The non-application area 33 extends so as to reach an inner side of the cavity 40, that is, a position in an inner side than an end portion 11c in a width direction of the groove-shaped concave portion 11, from a position in an outer side of the cavity 40.

As a method of forming the adhesive agent layer 30 which has the areas 31 to 33 as mentioned above and is formed into the plane shape by applying the adhesive agent to the surface of the substrate 1, there can be applied a method of setting a mask having a shape corresponding to the non-application areas 33 on the surface of the substrate 1 and applying the adhesive agent from the above thereof by a spray application device, a method of using a screen plate with a mask having a shape corresponding to the non-application areas 33 and applying according to a screen printing, and an application method by an ink jet for applying without any mask according to data of an application pattern which has been previously read and stored.

Further, in the case that the substrate 1 having the adhesive agent layer 30 formed therein as mentioned above is set in the metal mold device and mold clamped as illustrated, the partial application area 32 of the adhesive agent is interposed between the substrate 1 and the mold clamping surface 12 of the upper mold 10 as shown in FIG. 1 and FIGS. 3A and 3B. As a result, a gap δ is formed in the non-application area 33 by the minute step in relation to the partial application area 32.

Therefore, in the case that the liquid rubber obtained by mixing a plurality of liquid molding materials is injected to the cavity 40 through a gate (not shown) in the upper mold 10, the remaining air within the cavity 40 and volatile gas from the liquid rubber are pushed out through the gaps δ which are formed at predetermined intervals in an extending direction of the cavity 40 between the substrate 1 and the mold clamping surface 12 of the upper mold 10 by the non-application area 33 of the adhesive agent and are discharged to the external portion, in a process that the liquid rubber is filled in the cavity 40.

Further, since the gap δ is minute, the air and the volatile gas can easily pass through the gap, however, the liquid rubber having a viscosity which is significantly greater than those of the air and the volatile gas cannot easily pass through the gap. Further, it is possible to effectively suppress the burr formation caused by the fact that the liquid rubber filled in the cavity 40 flows out to the gap δ.

The gasket 2 having a base 2a and a seal lip 2b is formed as shown in FIG. 4, by crosslinking and curing the liquid rubber by means of heating after the injection filling of the liquid rubber into the cavity 40 is finished, the base 2a being formed into a flat band shape, and the seal lip 2b protruding into a chevron shape having a V-shaped cross section from an upper surface of the base 2a. The gasket 2 is made by a rubber elastic material (a rubber material or a synthetic resin material having a rubber elasticity). Further, since the base 2a of the gasket 2 is integrally bonded to the substrate 1 via the adhesive agent layer 30, it is possible to take out the substrate integrated gasket having the structure in which the gasket 2 is integrally bonded to the substrate 1, by separating the upper mold 10 from the substrate 1 so as to open mold.

Further, according to the embodiment mentioned above, the remaining air and the volatile gas within the cavity 40 are easily discharged through the minute gap δ between the substrate 1 and the mold clamping surface 12 of the upper mold 10 provided by the non-application area 33 of the adhesive agent in the process of filling the liquid rubber in the cavity 40. As a result, it is possible to prevent the defective molding caused by the remaining air and the volatile gas, and the upper mold 10 is not necessarily provided independently with the air vent for discharging the air and the volatile gas from the cavity 40. Further, the burr generation cannot accordingly occur due to the outflow of the liquid rubber to the air vent, and it is possible to make the burr removing step unnecessary.

The description is given of the embodiment mentioned above on the assumption that the adhesive agent layer 30 formed by applying the adhesive agent to the surface of the substrate 1 alternately has the band-shaped partial application areas 32 and the non-application areas 33 at the predetermined intervals in the extending direction of the main application area 31. However, the forming pattern of the partial application areas 32 and the non-application areas 33 is not particularly limited as long as the partial application areas 32 are interposed between the substrate 1 and the mold clamping surface 12 of the upper mold 10 by mold clamping, and the gap δ generated by the minute step in relation to the partial application area 32 is formed in the non-application area 33.

Figure 5:
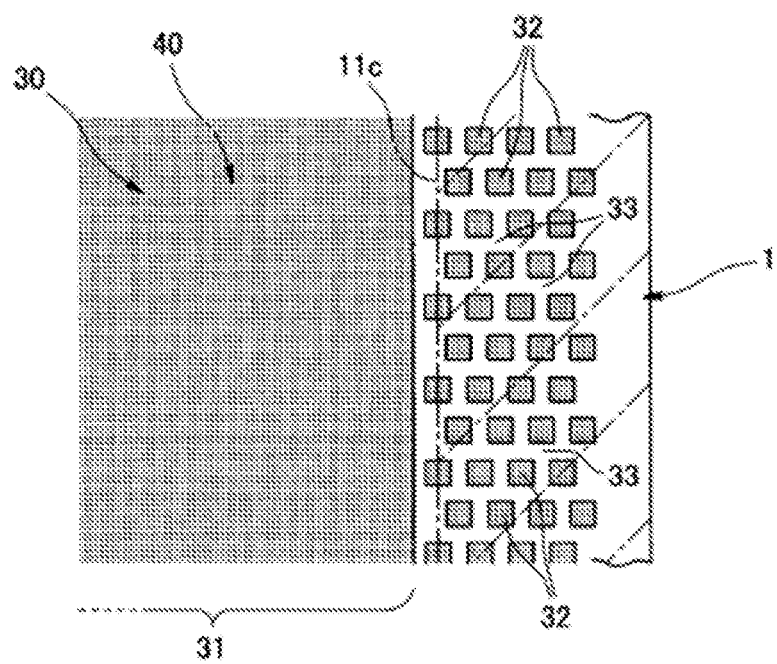
FIG. 5 is a partial plan view showing a relationship between an adhesive agent layer on a substrate and a metal mold in the other preferable embodiment of the method of manufacturing the substrate integrated gasket according to the present invention.
Figure 6:
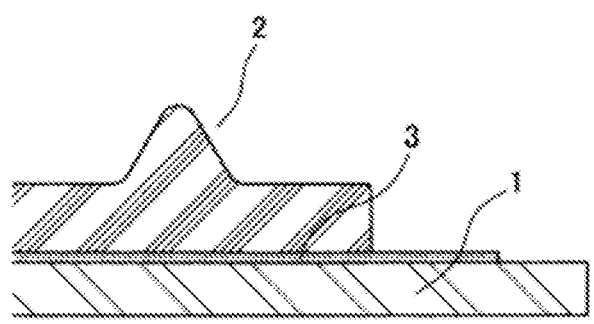
FIG. 6 is a partial cross sectional view showing an example of the substrate integrated gasket.
Figure 7:
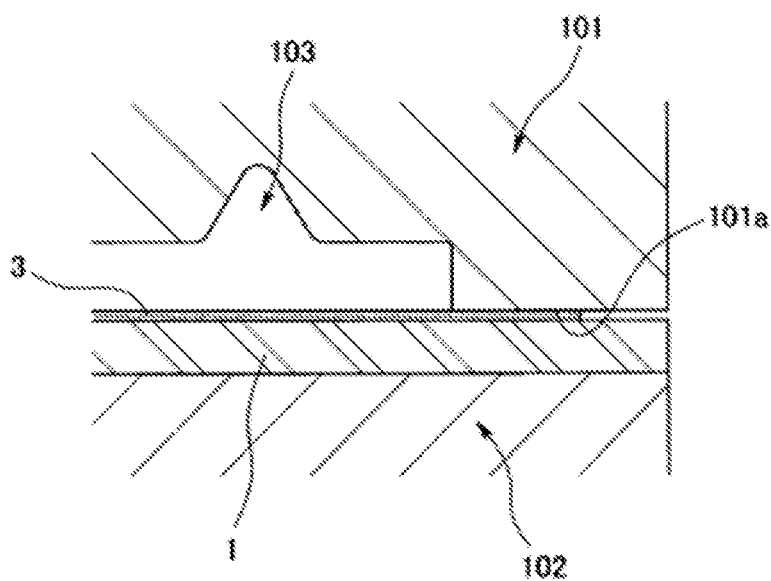
FIG. 7 is a partial cross sectional view showing a method of manufacturing a substrate integrated gasket according to a prior art.

For example, as shown in FIG. 5 as the other embodiment of the method of manufacturing the substrate integrated gasket according to the present invention, a lot of partial application areas 32 may be scattered from a position in an outer side of the cavity 40 toward a position in an inner side of the cavity 40 so as to form a hexagonal grid pattern or a square grid pattern, and the non-application areas 33 may continuously extend between the partial application areas 32.

What is claimed is:

1. A method of manufacturing a substrate integrated gasket comprising:

placing a substrate in a metal mold including a first mold and a second mold, the first mold defining an elongated cavity configured for receipt of an uncured molding material that, upon curing, will form the substrate integrated gasket;

applying an adhesive agent onto a surface of the substrate in a pattern that corresponds to a configuration of the substrate integrated gasket; and clamping the metal mold and providing the uncured molding material into the elongated cavity and onto the adhesive agent, and curing the uncured molding material to form the substrate integrated gasket, wherein the pattern of the adhesive agent includes a first section having dimensions that correspond to a length and width of substrate integrated gasket, and a plurality of second sections that extend in a width direction of the first section away from the first section, the plurality of second sections being separated by third sections that do not include the adhesive agent, wherein each of the plurality of second sections include a proximate portion attached to the first section at a location located within the elongated cavity such that the proximate portions are not clamped between the first mold and the substrate, and each of the plurality of second sections include a distal portion located away from the first section such that a terminal end of the distal portion is clamped between the first mold and the substrate, and wherein the third sections that do not include the adhesive agent define a passageway between the first mold and the substrate from the elongated cavity to an exterior of the metal mold that is configured to expel a gas from the elongated cavity during the providing of the uncured molding material into the elongated cavity.

* * * * *